United States Patent [19]

Iwamoto

[11] Patent Number: 4,972,343
[45] Date of Patent: Nov. 20, 1990

[54] KNOWLEDGE PROCESSING SYSTEM

[75] Inventor: Masahiko Iwamoto, Tokyo, Japan

[73] Assignee: NEC Corporation, Tokyo, Japan

[21] Appl. No.: 219,273

[22] Filed: Jul. 15, 1988

[30] Foreign Application Priority Data

Jul. 16, 1987 [JP] Japan ................................ 62-175940

[51] Int. Cl.$^5$ ............................................ G06F 15/18
[52] U.S. Cl. ................................................... 364/513
[58] Field of Search ............ 364/513, 200, 274, 274.1, 364/277

[56] References Cited

U.S. PATENT DOCUMENTS 4,675,829 6/1987 Clemenson .......................... 364/513
4,827,404 5/1989 Barstow et al. ...................... 364/200

OTHER PUBLICATIONS

"A Guide to Expert Systems" published in 1986 by Addison-Wesley Publishing Company.
"Object-Oriented Programming: Themes and Variations", published in AI magazine, vol. VI, No. 4, 1986.

Primary Examiner—Allen MacDonald
Attorney, Agent, or Firm—Foley & Lardner, Schwartz, Jeffery, Schwaab, Mack, Blumenthal & Evans

[57] ABSTRACT

A knowledge processing system for use in an information processing apparatus. The system comprises a knowledge base which is divided into a slot data section and an object data section; a data reference section; a data updating device; and an interpreter. By changing the updating system according to the relationship between the number of controlled data and the boundary value, data search is achieved in an optimum manner.

3 Claims, 6 Drawing Sheets

EXPRESSION IN LISP LANGUAGE
((EMPLOYEE OF COMPANY A, ORANGE)
(EMPLOYEE OF COMPANY B, GREEN)...)

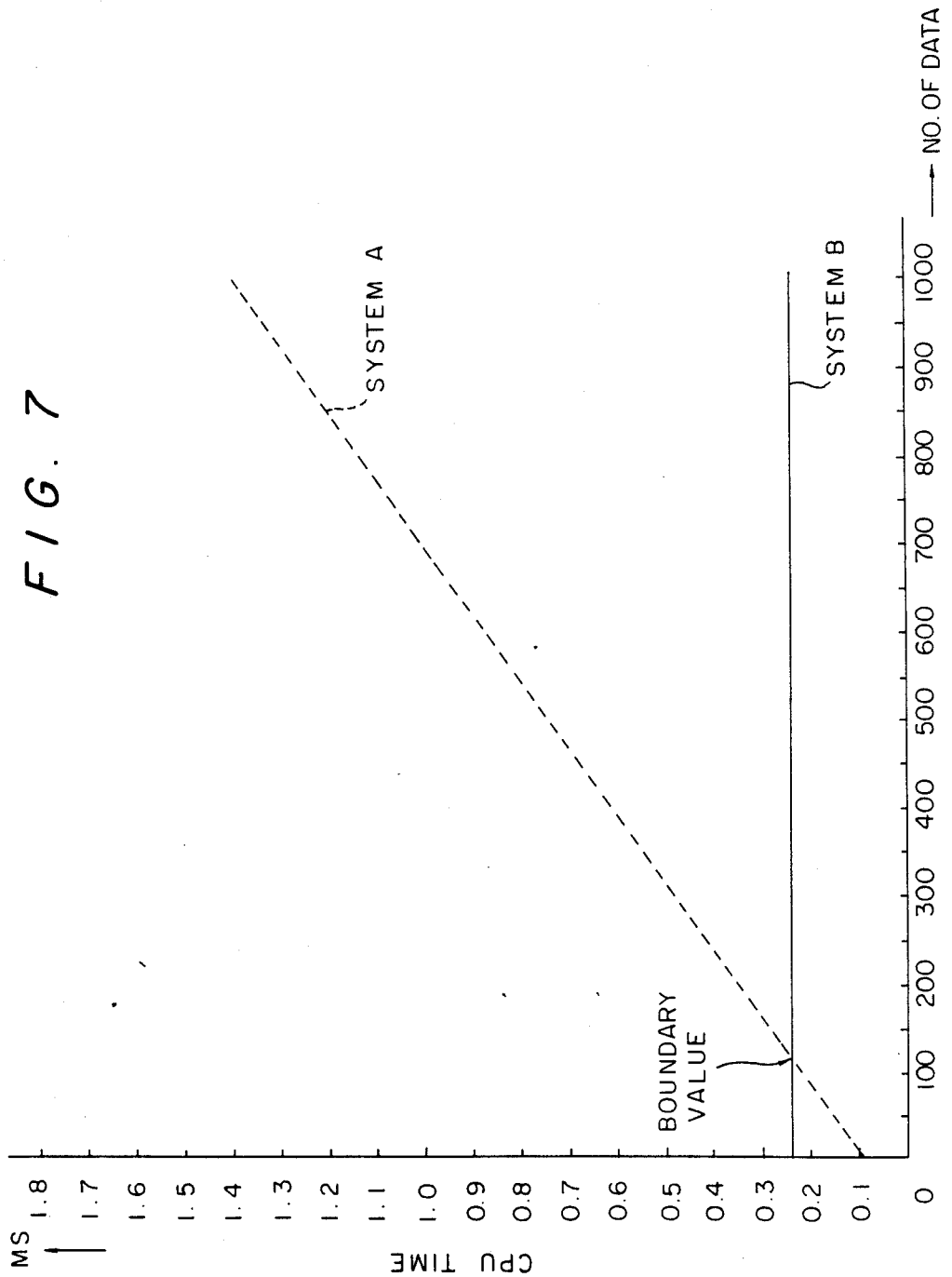

KNOWLEDGE PROCESSING SYSTEM

BACKGROUND OF THE INVENTION

The present invention relates to a knowledge processing system for use in an information processing apparatus.

In a frame language and an object-oriented language in a knowledge processing system, inheritance hierarchy constitutes an important language element. Control and operation of this inheritance hierarchy is one of the problems in structuring a knowledge processing system for executing a frame language and an object-oriented language. The control and operating system for this inheritance hierarchy is different for a frame language executing system than for an object-oriented language executing system.

Regarding frame language, reference may be made to pages 73 to 79 of the publication by Donald A. Waterman, entitled "A Guide to Expert Systems" published in 1986 by Addison-Wesley Publishing Company. For control and operation of an object-oriented language and inheritance hierarcy, reference may be made to pages 40 to 62 of the publication by Mark Stefik and Daniel Bobrow entitled "Object-Oriented Programming: Themes and Variations", published in AI magazine, Volume VI, Number 4, 1986 by the American Association for Artificial Intelligence (hereunder referred to as "Reference").

In many systems for executing languages which require model flexibility, a search system is used. This search system formulates a model in one-to-one correspondence with the objects of expression, and refers to slot values by searching inheritance hierarchy. The system "LOOPS" introduced in the above cited Reference is this kind of search system.

This search system, as the addition or alteration of slots in a class or the alteration of inheritance hierarchy is locally achieved therein, is capable of high speed processing. Since search is performed at the time of referring, however, it has the disadvantage of taking a long time for reference. In many systems for executing languages in which the executing efficiency of this reference is important, a compile system is used. This compile system determines in advance the position of an inheritable slot for each object. The system "FLAVORS" introduced in the above cited Reference is a type of this compile system.

This compile system, as it requires no search at the time of referring, can perform reference at high speed. It nevertheless has the disadvantage of taking a long time to add or alter slots in a class or to alter inheritance hierarchy because the alteration entails a substantial modification in each instance.

SUMMARY OF THE INVENTION

It is, therefore, an object of the present invention to provide a knowledge processing system designed to obviate the foregoing disadvantages.

According to one aspect of the invention, there is provided a system, which comprises:

knowledge base means divided into a slot data section for storing slot data and an object data section for storing object data;

data reference means for referring to data in this knowledge base means;

data altering means for altering data in said knowledge base means; and interpreter means for interpreting and executing a command, an instruction or data from the user, and giving an instruction to said data reference means or said data altering means.

Further, a first method according to another aspect of the invention comprises:

a slot data reading step for referring to the slot data section and reading out desired slot data;

a judging step for judging whether or not a desired object is present in the slot data read out by this slot data reading step;

a first notifying step for notifying, if the desired object is judged to be present by the judging step, an input/output unit of a slot value corresponding to the desired object;

an object list reading step for reading out, if the desired object is judged to be absent by said judging step, a desired object list;

a comparing step for comparing the object list read out by this object list reading step and the slot data read out by said slot data reading step;

a second notifying step for notifying the input/output unit of the slot value corresponding to the object identified by this comparing step; and a third notifying step for giving a notification of the absence of the desired object in the slot data if it is not identified by said comparing step.

A second method according to still another aspect of the invention comprises:

a slot data reading step for reading desired slot data;

a judging step for judging whether or not an object to be altered is present in the slot data read out by this slot data reading step;

an altering step for altering, if the desired object is judged to be present by this judging step, a slot value corresponding to the desired object;

a comparing step for comparing, if the desired object is judged to be absent by said judging step, the number of controlled data and its boundary value; and an updating step for updating data according to the result of comparison by this comparing step.

BRIEF DESCRIPTION OF THE DRAWINGS

Other objects, features and advantages of the present invention will be more apparent from the detailed description hereunder when taken in conjunction with the accompanying drawings, in which:

FIG. 7 illustrates the relationships between the number of data and the average CPU time required per search under the two data control systems.

In the drawings, the same reference numerals denote respectively the same structural elements.

DETAILED DESCRIPTION OF THE PREFERRED EMBODIMENTS

Figure 1:
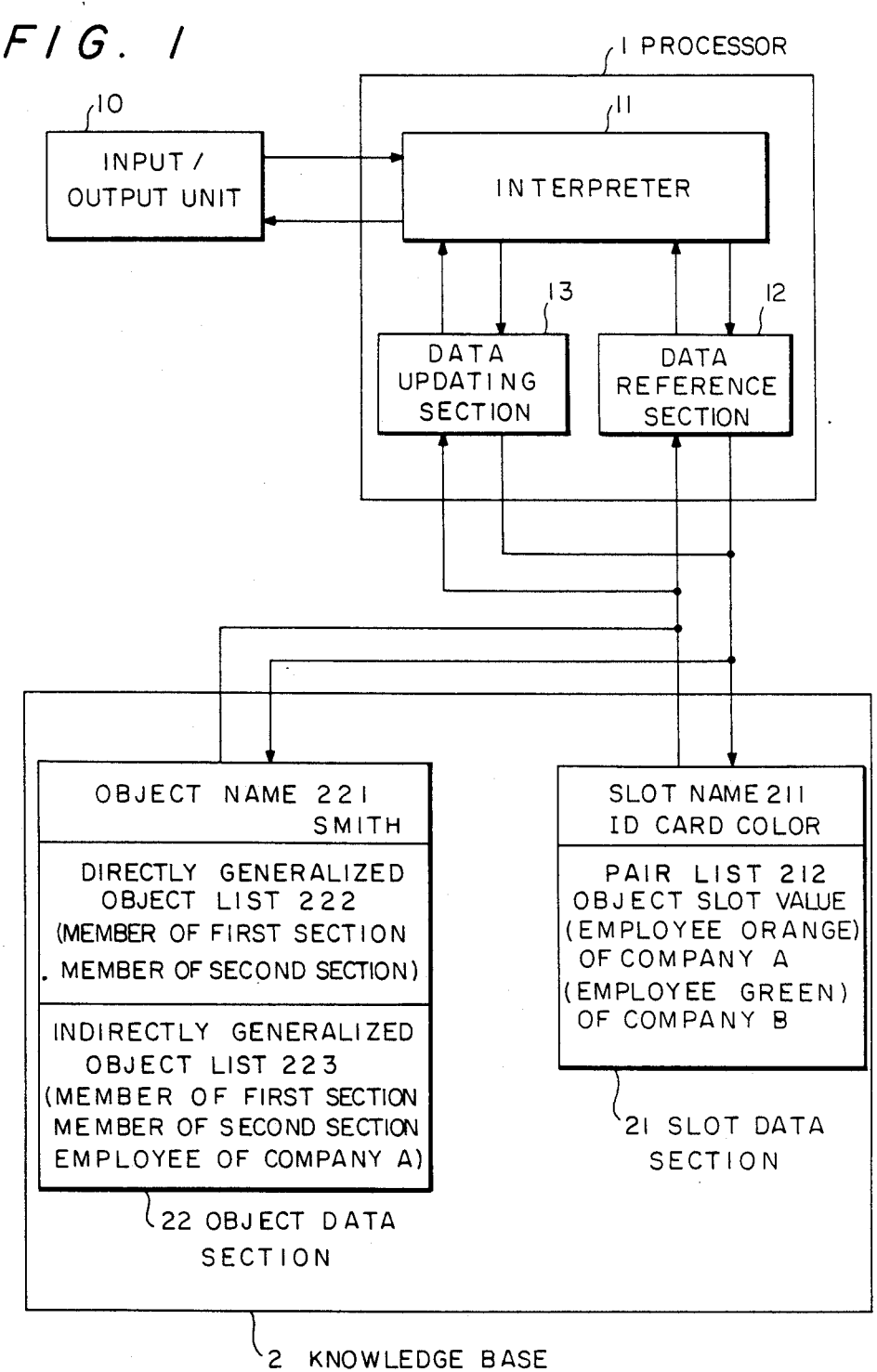
FIG. 1 illustrates an apparatus to which the present invention is applicable.

Referring to FIG. 1, an apparatus to which the present invention is applicable is provided with a knowledge base 2 having an object data section 22 for storing a set of object data and a slot data section 21 for storing data concerning slot values; a processor 1 having a data reference section 12 for referring to the object data section 22 and the slot data section 21, a data updating section 13 for updating data in at least the slot data section 21 by a system according to the number of controlled data, and an interpreter 11 for giving instructions to the data reference section 12 and the data updating section 13; and an input/output unit 10 for entering a command, an instruction or data from the user into the interpreter 11 of this processor 1 and indicating the result of processing to the user.

Next will be described in detail a knowledge base applicable to one preferred embodiment of the invention with reference to FIGS. 1 and 2.

Figure 2:
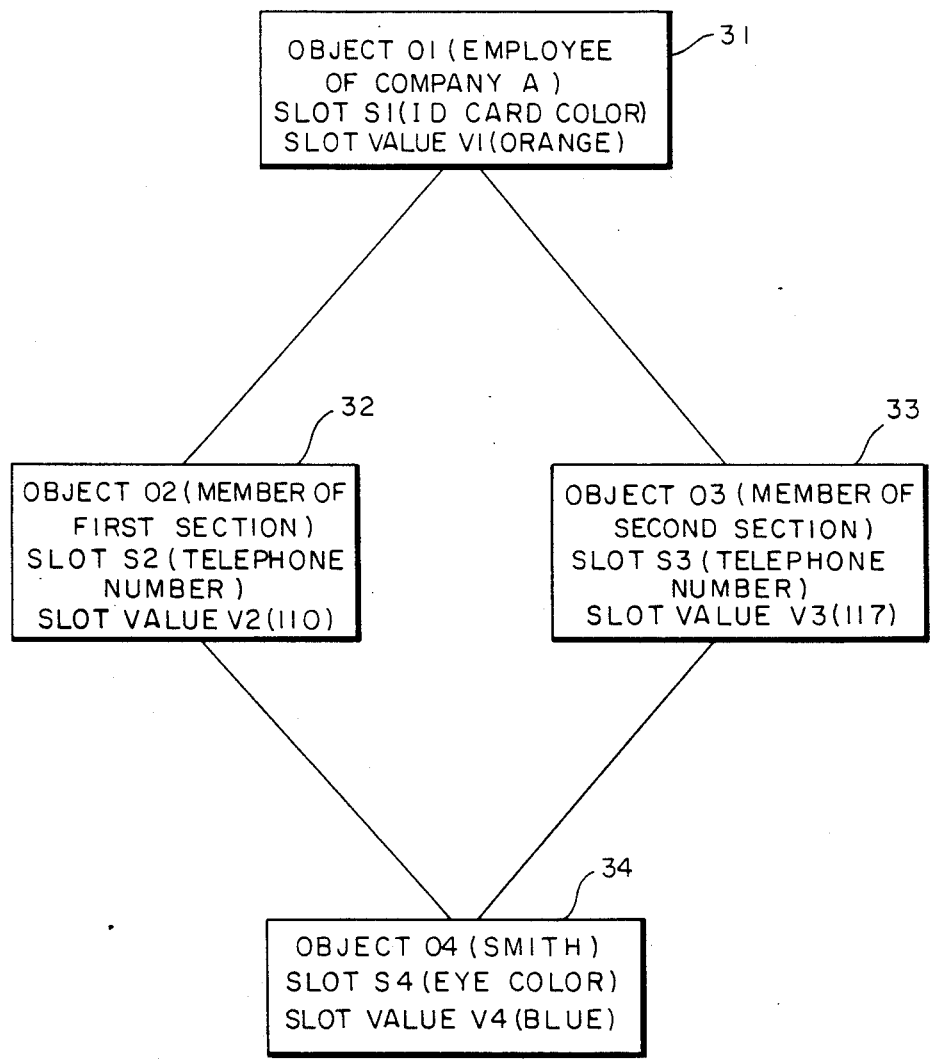
FIG. 2 is a diagram for explaining the generalization relationship of knowledge base which the invention presupposes.

Referring to FIG. 2, an example of knowledge base sets for highest concept 31 "employee of Company A" as object 01, which is a specific object datum, "ID card color" as slot S1 indicating one of its attributes, and "orange" as value V1 of the slot. It further sets for first intermediate concept 32 "member of First Section" in Company A as object 02, "telephone number" as slot S2 indicating one of its attributes, and telephone number "110" as value V2 of the slot; for second intermediate concept 33 "member of Second Section" in Company A as object 03, "telephone number" as slot S3 indicating one of its attributes, and telephone number "117" as value V3 of the slot; and for subconcept 34 to first intermediate concept 32 and second intermediate concept 33 "Smith" concurrently belonging to the First and Second Sections as object 04, "eye color" as slot S4 indicating one of his attributes, and "blue" as value V4 of the slot. The segments linking these objects indicate the relationship of generalization, a lower object being able to inherit a slot in a higher object. For instance, "First Section" of object 02 and "Second Section" of object 03 can be inherited by "Smith" of object 04, and "employee of Company A" of object 01 can be inherited by objects 02 and 03.

Referring now to FIGS. 1 and 2, the object data section 22 has an object name 221 of "Smith", a directly generalized object list 222 indicating objects "member of First Section" and "member of Second Section" which are in a relationship of direct generalization to this "Smith", and an indirectly generalized object list 223 indicating objects "member of First Section", "member of Second Section" and "employee of Company A", which are in a relationship of indirect generalization to said "Smith".

The slot data section 21 has a slot name 211 of "ID card color" and a pair list 212 further having objects "Company A" and "Company B", and slot values "orange" and "green" of these objects in object-slot value pairs.

In the referring procedure, a desired value can be found at high speed by searching the slot data section 21 in accordance with a list in which the directly and indirectly generalized objects of the pertinent object are sequentially arranged.

The operation of the processor 1 in this first preferred embodiment will now be described in detail with reference to FIGS. 1 to 3.

Referring to FIG. 1, the user enters into the input/output unit 10 a question, "What is the color of Mr. Smith's ID card?".

Figure 3:
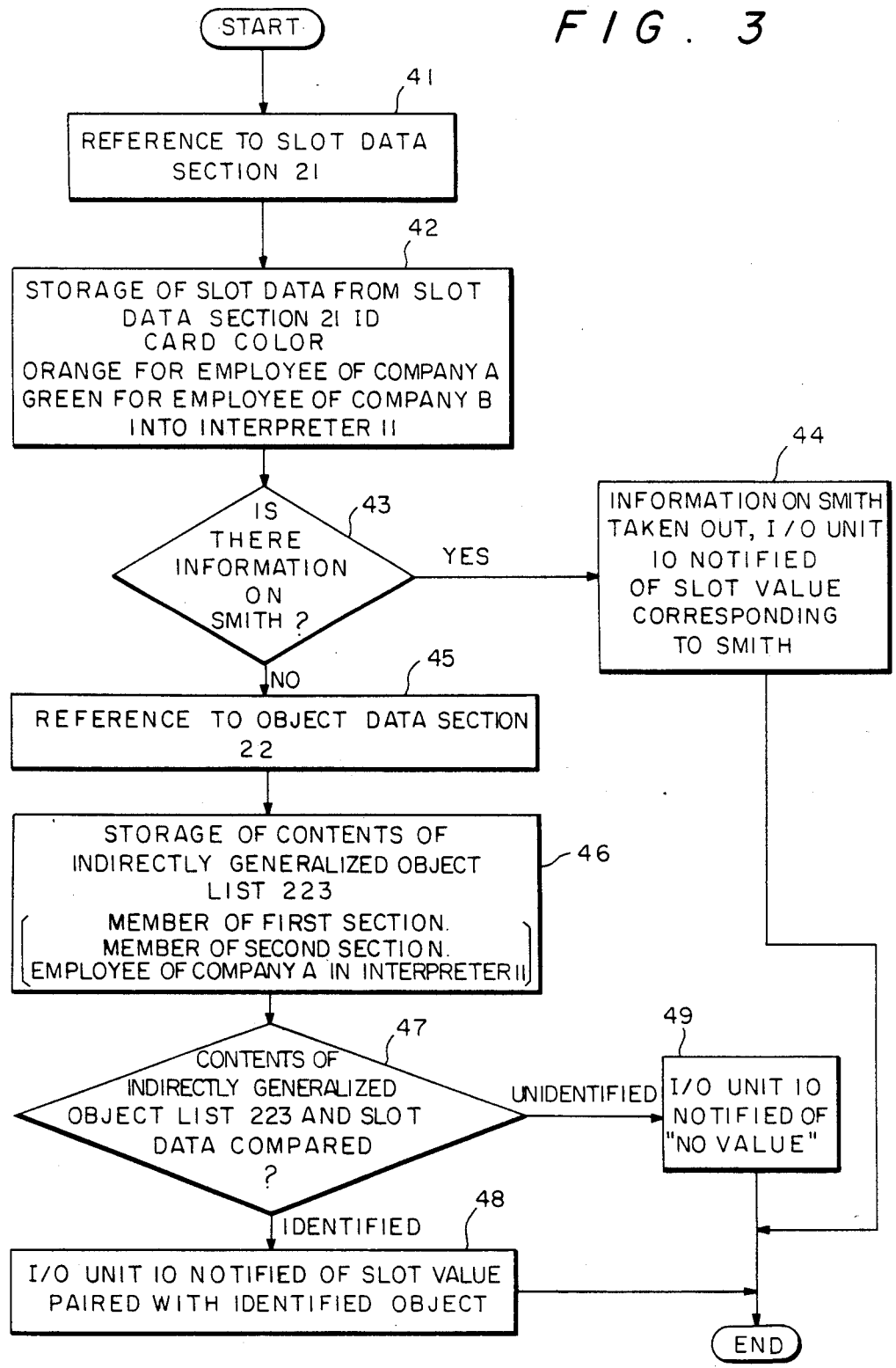
FIG. 3 illustrates a first preferred embodiment of the invention.

Referring now to FIGS. 1 and 3, the interpreter 11 having received this question instructs the data reference section 12 to refer to the slot data section 21 (41). In response to this instruction, the data reference section 12 reads slot data "ID card color, orange for employee of Company A, green for employee of Company B" out of the slot data section 21, and store them in the interpreter 11 (42). The interpreter 11 judges whether or not any information on "Smith" is present in the stored slot data (43). At this step 43, if any information on "Smith" is present, the interpreter 11 will notify the input/output unit 10 of the slot value corresponding to object 04 "Smith", and a reply will be thereby given to the user (44).

In this first embodiment, because of the absence of information on "Smith" at judging step 43, the interpreter 11 instructs the data reference section 12 to refer to the object data section 22 (45). Responding to this instruction, the data reference section 12 accesses the object data section 22, reads out the contents of the indirectly generalized object list 223, "member of First Section, member of Second Section and employee of Company A", and stores them in the interpreter 11 (46). The interpreter 11 compares the contents of the indirectly generalized object list 223, which have been stored, and the already stored contents of the pair list 212 (47). In this first embodiment, the "employee of Company A" content of the indirectly generalized object list 223 is identified with the "employee of Company A" object of the pair list 212, and the interpreter 11 notifies the input/output unit 10 of slot value "orange", which forms a pair with the identified object (48). If comparison at step 47 led to no identification, the interpreter 11 would notify the input/output unit 10 of "no value" (49).

Thus, since reference is accomplished by comparing the indirectly generalized object list in the object data section with the contents of the pair list 212 in the slot data section and picking out the slot value paired with the identified object, reference can be performed faster than search system could achieve and as fast as compile system could achieve.

Next will be described in detail with reference to drawings how the data base is altered.

There are two data control systems, as described below, permitting one-to-one correspondence of objects and slot values in the pair list 212.

Figure 4:
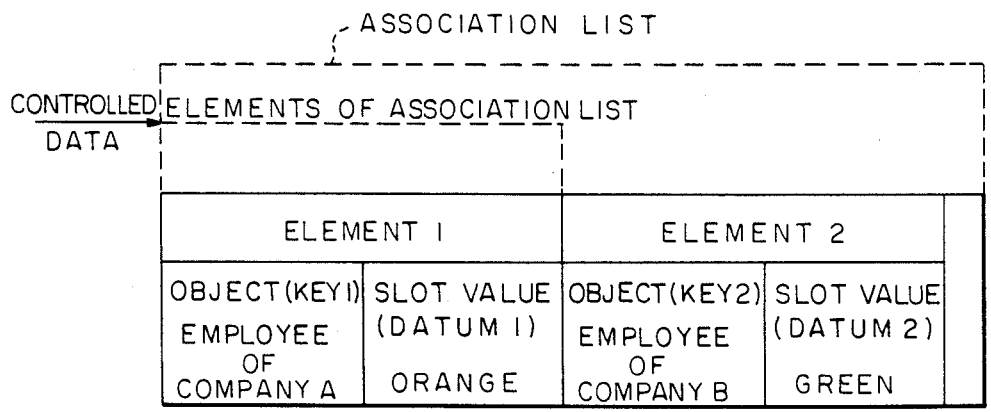
FIG. 4 is a diagram for explaining data control by system A.

Referring to FIG. 4, the first system is a data control system (hereinafter called "system A") using only an association list having objects and slot values as its elements. Data updating by this system A is simply to add to or subtract from the association list elements each consisting of an object (key) and a slot value (datum). The data reference method by this system A, as with the first preferred embodiment, is to successively search the objects (keys) from the first of the elements in the association list and to return the datum of the element whose object (key) is identified.

Figure 5:
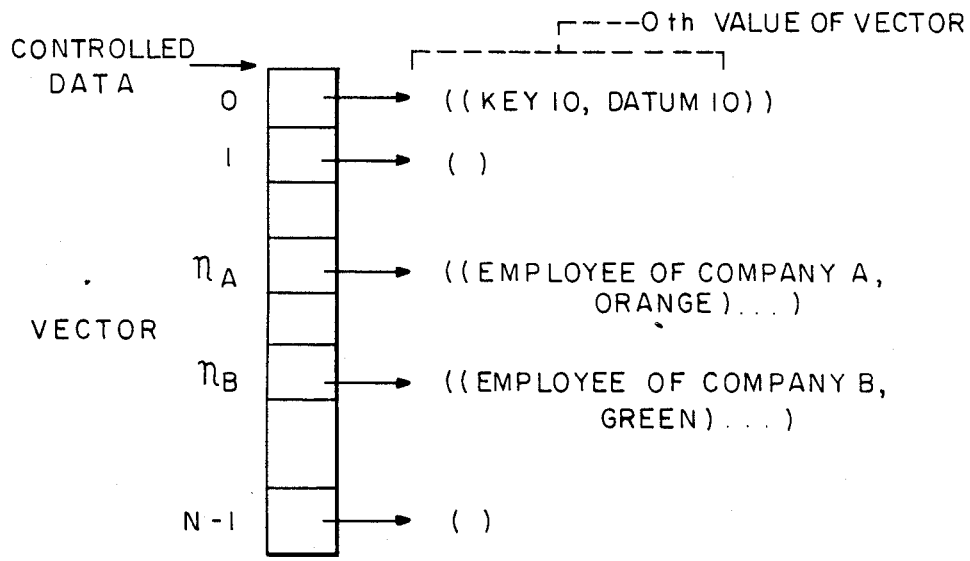
FIG. 5 is a diagram for explaining data control by system B.

Referring now to FIG. 5, the second is a data control system using the combination of a vector and an association list. Thus LISP functions f(A) and f(B), known as HASH, are executed with objects (keys) as parameters, and values $\eta_A$ and $\eta_B$ resulting from the arithmetic operations serve as vector array numbers for the control purpose, according to which values in the vector are obtained. In this example, the number of data arrayed is N, and ( ) denotes the absence of the first value of the vector.

According to a second preferred embodiment of the present invention, when the knowledge base is to be updated, the number of controlled data (M) and a boundary value (N) are compared, and data updating is accomplished by system A if the number of controlled data (M) is smaller than the boundary value (N), or by system B if the former is greater than the latter.

This operation will be described in detail with reference to FIGS. 1 and 6.

Referring to FIG. 1, the user gives the input/output unit 10 an instruction to alter the data to "ID card color of employee of Company C is blue".

Figure 6:
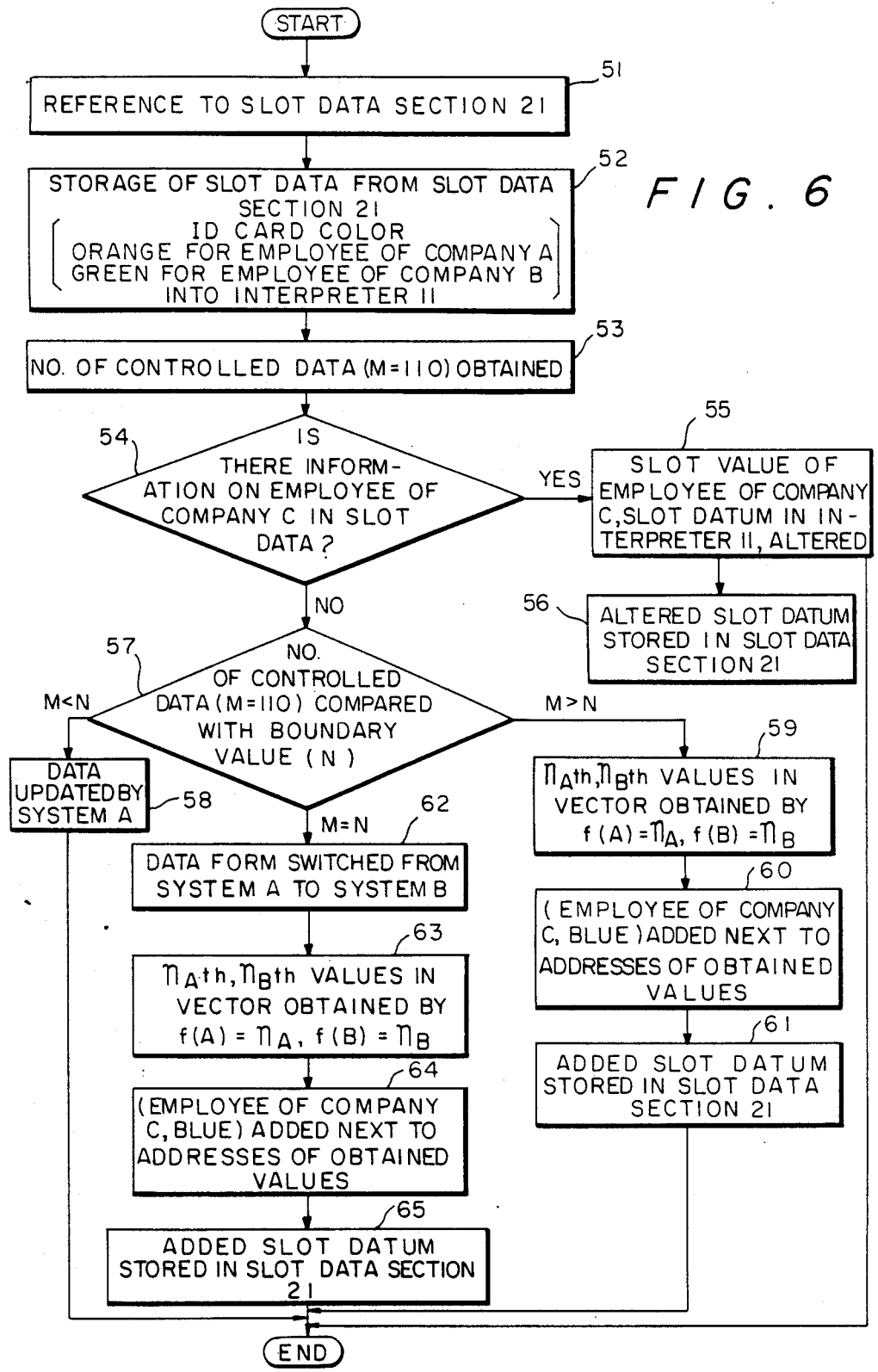
FIG. 6 illustrates a second preferred embodiment of the invention.

Referring now to FIGS. 1 and 6, in response to an altering instruction from the input/output unit 10, the interpreter 11 gives the data reference section 12 an instruction to refer to the slot data section 21 (51). Responding to this reference instruction, the data reference section 12 accesses the slot data section 21, reads out slot data "ID card color, orange for employee of Company A, green for employee of Company B", and stores them in the interpreter 11 (52). Next the interpreter 11 obtains the number of controlled data (M=110) (53). Afterwards the interpreter 11 judges whether or not there is any information concerning Company C in the slot data (54). If the interpreter judges at step 54 there is information on Company C in the slot data, the slot value corresponding to object datum "employee of Company C", which is one of the slot data in the interpreter 11, is altered to "blue" (55). The altered datum is stored from the interpreter 11 through the data updating section 13 into the slot data section 21 (56).

However, in the second embodiment of the invention, if it is judged that there is no information regarding Company C in the slot data (54). The interpreter 11 compares the number of controlled data (M=110) and the boundary value (N) (57).

This boundary value (N) is determined in the following manner.

FIG. 7 illustrates the relationships between the number of controlled data and the average CPU time required per search under systems A and B. According to system A, the CPU time required for search, varies with the number of controlled data, while according to system B, the required CPU time is constant, hardly affected by the number of data. Therefore, the CPU time relationship between the two systems is reversed at N=110, the boundary value of the number of data. Thus system A takes a longer time when the number of controlled data (M) is beyond its boundary value (N=110), and so does system B when the number of data is below the boundary value. In view of this difference, a feature of the present invention is that processing is achieved such that data be updated by system A if the number of controlled data (M) is smaller than its boundary value (N=110) or by system B if the number of controlled data (M) is greater than its boundary value (N=110). Referring to FIG. 6, in the second embodiment of the invention, if the number of controlled data (M) is smaller than its boundary value (N) at step 57, data will be updated by system A (58), or by system B if the number of controlled data (M) is greater than its boundary value (59, 60 and 61). Thus functions f(A) and f(B) are calculated to give $\eta_A$ and $\eta_B$ (59). Next to these addresses are added an object (employee of Company C) and a slot value (blue), which are slot data (60). Then, the added slot data are stored in the slot data section 21 (61).

Now, in the second embodiment, the number of controlled data (M) may be the same as the boundary value (N). Therefore, when the two numbers are the same, the data form is switched from system A to system B (62). Thereafter, data updating is achieved (63, 64 and 65) in the same manner as described above for system B (59, 60 and 61).

As a result, by dividing the knowledge base into the slot data section 21 and the object data section 22, the present invention makes it possible to achieve alteration faster than the compile system could achieve and as fast as the search system could achieve. As the invention further enables the knowledge base dimensions to be made smaller than those used in the compile system and as small as those used in the search system, there are the benefits of facilitating alteration, accelerating reference and reducing the knowledge base dimensions.

The invention, by changing the updating system according to the relationship between the number of controlled data and the boundary value, provides the data reference procedure with the additional benefit of achieving data search in the quickest way possible irrespective of the number of controlled data.

What is claimed is:

1. A knowledge base reference method comprising:
   a slot data reading step for reading desired slot data;
   a judging step for judging whether or not a desired object is present in slot data read out by said slot data reading step;
   a first notifying step for notifying, if said desired object is judged to be present by said judging step, an input/output unit of a slot value corresponding to said desired object;
   an object list reading step for reading out, if said desired object is judged to be absent by said judging step, a desired indirectly generalized object list;
   a comparing step for comparing said indirectly generalized object list read out by said object list reading step and said slot data read out by said slot data reading step;
   a second notifying step for notifying said input/output unit of a slot value corresponding to an object identified by said comparing step; and
   a third notifying step for giving a notification of absence of said desired object in said slot data, if said desired object is not identified by said comparing step.

2. A knowledge base updating method comprising:
   a slot data reading step for reading desired slot data;
   a judging step for judging whether or not an object to be altered is present in slot data read out by said slot data reading step;
   an altering step for altering, if a desired object is judged to be present by said judging step, a slot value corresponding to said desired object;
   a comparing step for comparing, if said desired object is judged to be absent by said judging step, a number of controlled data and an associated boundary value; and
   an updating step, which updates data according to a result of comparison by said comparing step, said updating step using a first updating method if a first relationship exists between said number of controlled data and said boundary value and using a second updating method, different from said first updating method, if a second relationship exists between said number of controlled data and said boundary value.

3. A method as set forth in claim 2, wherein said first updating method includes a hash technique.

* * * * *